United States Patent [19]

Chang

[11] Patent Number: 4,912,349

[45] Date of Patent: Mar. 27, 1990

[54] PIVOTALLY ADJUSTABLE ELECTRIC HAND TOOL

[76] Inventor: Jung C. Chang, No. 127, Shangping Li Chutung, Hsinchu Shien, Taiwan

[21] Appl. No.: 352,246

[22] Filed: May 16, 1989

[51] Int. Cl.⁴ .......................... H02K 7/14; B25G 1/00
[52] U.S. Cl. ..................... 310/50; 173/163; 173/170; 403/91
[58] Field of Search ............... 310/47, 50, 89; 30/151, 30/330, 340; 81/475; 173/163, 170

[56] References Cited

U.S. PATENT DOCUMENTS

| | | | |
|---|---|---|---|
| 1,652,980 | 12/1927 | Glass | 403/91 |
| 3,509,629 | 5/1970 | Kidokoro et al. | 310/75 R |
| 4,332,147 | 6/1982 | Grech | 173/163 |
| 4,347,450 | 8/1982 | Colligan | 310/50 |
| 4,522,270 | 6/1985 | Kishi | 173/163 |

Primary Examiner—Patrick R. Salce
Assistant Examiner—D. L. Rebsch
Attorney, Agent, or Firm—Brumbaugh, Graves, Donohue & Raymond

[57] ABSTRACT

A DIY (Do It Yourself) electric hand tool is provided to include a front segment and a rear segment which may be pivotably coupled to each other at one respective end thereof. A latching mechanism is provided between the coupled respective ends of the front and rear segments so that one of the front and rear segments may selectively be pivoted relative to the other of the front and rear segments to and be latched in one of a first position and a second position which endows the DIY electric hand tool with a configuration which fits the DIY tool to a specific working environment.

8 Claims, 2 Drawing Sheets

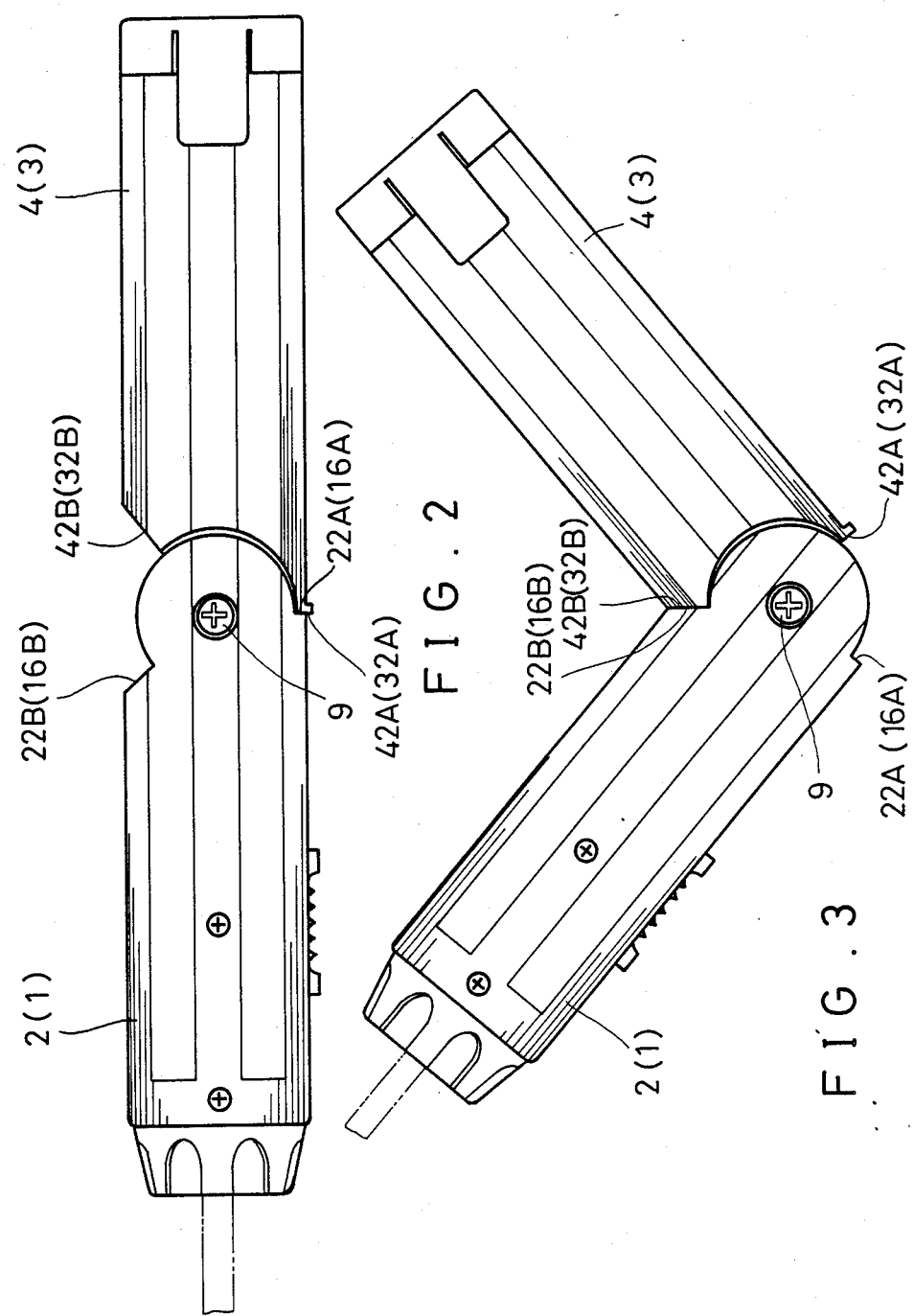

PIVOTALLY ADJUSTABLE ELECTRIC HAND TOOL

BACKGROUND OF THE INVENTION

The present invention relates generally to an improved electric hand tool and, particularly, to an improved DIY (Do It Yourself) electric hand tool which may be adapted to have either a substantially linear configuration or an "L" shaped configuration in order to fit a specific working environment.

Almost all conventional DIY electric hand tools have fixed configurations which cannot be changed to fit specific working environments. The use of such conventional types of hand tools is therefore inconvenient. Consequently, there is a need for a DIY electric hand tool of a configuration which may be changed to fit specific working environments.

SUMMARY OF THE INVENTION

In view of the foregoing, the object of the present invention is to provide an improved DIY electric hand tool of a configuration which is alterable to fit a specific working environment in which the hand tool is to be used.

In accordance with the present invention, a DIY electric hand tool comprises a front segment having a first empty inner space adapted for receiving a driving motor and a speed-reducing mechanism driven by the driving motor, a first front end of the front segment adapted for the mounting of a tool head driven by the driving motor through the speed-reducing mechanism, and a first rear end of the front segment provided with a first pivoting portion; a rear segment having a second empty inner space adapted for the containment of a battery supplying power to the driving motor, a second front end of the rear segment provided with a second pivoting portion, the front segment and the rear segment being connected to each other by a detachable and pivotable connection between the first pivoting portion and the second pivoting portion so that one of the front and rear segments may be pivoted relative to the other between a first position in which the front segment and the rear segment are substantially in a straight line and a second position in which the front segment intersects the rear segment at a predetermined angle; and a latching mechanism for retaining one of the front and rear segments in the first or second position relative to the other of the front and rear segments.

BRIEF DESCRIPTION OF THE DRAWINGS

The foregoing and other objects and features of the present invention can be more fully understood by reference to the following description and accompanying drawings, which form an integral part of this application:

FIG. 2 is a side elevational view of the DIY electric hand tool of FIG. 1, after assembly, wherein a front segment of the tool is latched in a first, linear position relative to a rear segment of the tool, with a tool head, such as a drill bit, shown in a dotted line, being mounted to a front end of the front segment; and FIG. 3 is a side elevational view similar to FIG. 2, showing the front segment of the hand tool of the present invention being latched in a second, 90-degree position relative to the rear segment.

DETAILED DESCRIPTION OF THE PREFERRED EMBODIMENTS

Figure 1:
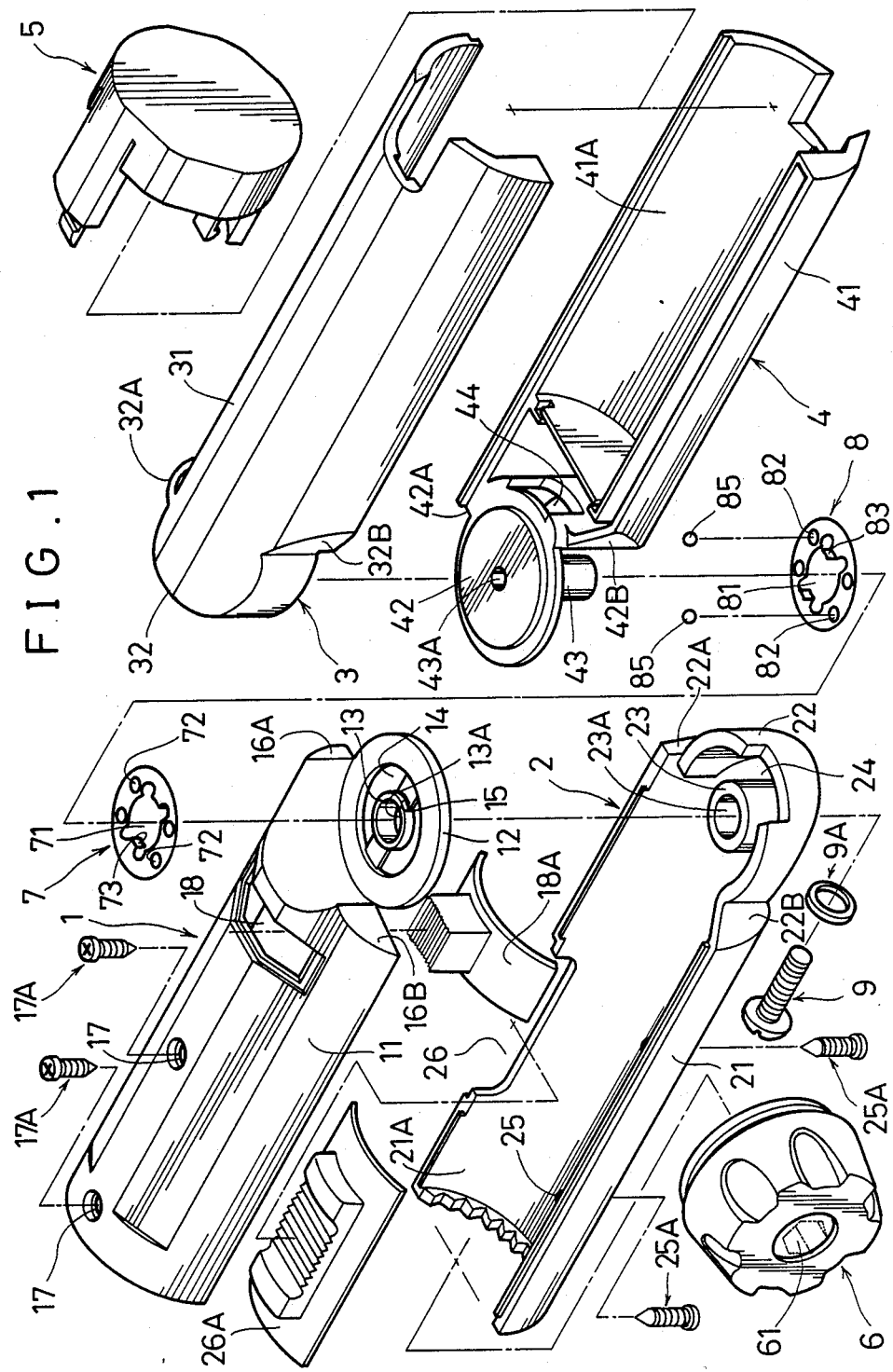
FIG. 1 is an exploded perspective view of a preferred embodiment of the present invention, showing the configuration and arrangement of the respective components of a DIY electric hand tool according to the present invention.

FIG. 1 shows the detailed structures of the comprised components of a DIY electric hand tool according to a preferred embodiment of the present invention. The DIY hand tool of the present invention essentially includes an upper front cover 1, a lower front cover 2, an upper rear cover 3, a lower rear cover 4, a rear end cap 5, a front end cap 6, a first positioning plate 7, a second positioning plate 8, positioning balls 85, and a set screw 9. A battery, a driving motor, a speed-reducing mechanism and a tool head (such as a drill bit) all adapted to be mounted in the body of the hand tool of the present invention are not shown in the drawings, because they bear no relation to the essential teaching of the present invention.

Each of the body portions 11, 21, 31 and 41 of the upper front cover 1, lower front cover 2, upper rear cover 3 and lower rear cover 4, respectively, is of the shape of a half-cylinder closed at one end. The half-cylinder of the upper front cover 1 and the half-cylinder of the lower front cover 2 may be combined to form a cylindrical front segment of the DIY electric hand tool of the present invention. The front segment so formed has an empty inner chamber 21A into which a driving motor and a speed-reducing mechanism driven by the driving motor may be located. The half-cylinder of the upper rear cover 3 and the half-cylinder of the lower rear cover 4 may be combined to form a cylindrical rear segment of the DIY electric hand tool of the present invention. The rear segment so formed has an empty inner chamber 41A into which a battery powering the driving motor may be located. A front end cap 6 closes the front end of the front segment and a rear end cap 5 closes the rear end of the rear segment. The front end cap 6 has a through hole 61 centrally located in its end surface for allowing a tool head (illustrated in dotted line in FIGS. 2 and 3) to be inserted through the hole 61 so as to be engaged and driven by a driving portion of the speed-reducing mechanism.

The body portion 11 of the upper front cover 1 and the body portion 21 of the lower front cover 2 have fastening apertures 17 and 25 through which screws 17A and 25A are threadedly inserted to secure the upper front cover 1 and the lower front cover 2 to the speed-reducing mechanism so as to form the front segment of the DIY electric hand tool of the present invention. The upper rear cover 3 and the lower rear cover 4 are assembled in a similar manner so as to form the rear segment of the DIY electric hand tool of the present invention.

The front segment and the rear segment of the DIY electric hand tool of the present invention are coupled to each other by pivotably connecting a first pivoting portion formed at a rear end of the front segment and a second pivoting portion formed at a front end of the rear segment. A latching mechanism is arranged to latch the DIY electric hand tool of the present invention in either a substantially linear configuration shown in FIG. 2 or an "L" shaped configuration shown in FIG. 3.

As shown in FIG. 1, the above-mentioned first pivoting portion includes a flat first disc portion 12 integrally formed at the rear end of the body portion 11 of the upper front cover 1 in the plane containing the butting edges of the upper front cover 1 and the lower front cover 2, and a first round head portion 22 integrally formed at the rear end of the body portion 21 of the lower front cover 2 and overlapping, when assembled, the first disc portion 12. A first cylindrical portion 13 is centrally located on the first disc portion 12 and has a central through hole 13A. An annular recess 14 is provided around the first cylindrical portion 13. Two slits 15 (only one is shown in FIG. 1) are provided in the recess 14 at two diametrically opposite positions on the outer periphery of the first cylindrical portion 13. The first round head portion 22 is hollow in its interior and has an outer diameter substantially the same as that of the first disc portion 12. Inside of the first round head portion 22 is provided with a second cylindrical portion 23 having a central through hole 23A of which the inner diameter is the same as that of the through hole 13A. When assembled, the through hole 23A is aligned with the through hole 13A.

At the juncture between the body portion 11 of the upper front cover 1 and the first disc portion 12, two upper stop surfaces 16A, 16B are radially provided, each being substantially normal to a plane containing the first disc portion 12. As can be seen from FIG. 2 or 3, both the plane containing the upper stop surface 16A and the plane containing the upper stop surface 16B pass through the center of the first disc portion 12 and intersect each other at an angle of approximately 135 degrees. On the lower front cover 2 and next to the first round head portion 22, two lower stop surfaces 22A, 22B similar to the upper stop surfaces 16A, 16B are provided at locations corresponding to those of the upper stop surfaces 16A, 16B. The provision of the stop surfaces 16A, 16B, 22A and 22B is to be used to limit the range of the relative pivotal movement between the upper front cover 1 and the lower front cover 2.

Additionally, a switch button opening 18 for arranging a switch button, and a speed-regulating button opening 26 for arranging a speed-regulating button are provided in the upper front cover 1 and the lower front cover 2 in a conventional manner. A wiring recess 24 is provided in a front end wall of the first round head portion 22 for wiring from the front segment of the DIY electric hand tool to the rear segment.

Also as shown in FIG. 1, the above-mentioned second pivoting portion includes a flat second disc portion 42 integrally formed at the front end of the body portion 41 of the lower rear cover 4 in the plane containing the butting edges of the upper rear cover 3 and the lower rear cover 4, and a third cylindrical portion 43 formed integrally with and extending downwardly from a central region of the second disc portion 42. The third cylindrical portion 43 has an axis normal to the plane of the second disc portion 42 at the central point of the second disc portion 42. The outer diameter of the third cylindrical portion 43 is selected to allow it to be inserted into the central through hole 23A of the second cylindrical portion 23 through the through hole 13A of the first cylindrical portion 13 and, after being assembled, to allow a relative pivotal movement between the front segment and the rear segment. In addition, a tapped hole 43A is provided in the central area of the second disc portion 42 for a purpose to be described later.

A second round head portion 32 corresponding to the first round head portion 22 is similarly integrally formed at the front end of the body portion 31 of the upper rear cover 3 and overlaps, when assembled, the second disc portion 42. Two stop surfaces 32A, 32B are provided next to the second round head portion 32 of the upper rear cover 3 in a manner similar to that in which the stop surfaces 16A and 16B are provided next to the first round head portion 22. No portion corresponding to the second cylindrical portion 23 and the wiring recess 24 is provided in the second round head portion 32 of the upper rear cover 3. Therefore, no further illustration and descriptions are included herein with regard to the second round head portion 32 of the upper rear cover 3 and the stop surfaces 32A and 32B.

As further shown in FIG. 1, the latching mechanism of the DIY electric hand tool of the present invention consists of two positioning plates 7, 8 and two positioning balls 85, 85. The first positioning plate 7 has a cental opening 71, two pairs of positioning holes 72 and two engaging tabs 73. The engaging tabs 73 are directed toward the direction of the first disc portion 12 and are normal to the plane of the first positioning plate 7. The two tabs 73 are spaced from each other by 180 degrees along the inner periphery of the central opening 71. Similarly, the second positioning plate 8 has a central opening 81, two pairs of positioning holes 82 and two engaging tabs 83. The tabs 83 are directed toward the direction of the second disc portion 42 and are normal to the plane of the second positioning plate 8. The two tabs 83 are spaced from each other by 180 degrees along the inner periphery of the central opening 81. When assembled, the first positioning plate 7 is received in the annular recess 14 of the first disc portion 12 with each of the engaging tabs 73 being engagedly inserted into the corresponding one of the engaging slits 15, so as to prevent the rotational movement of the first positioning plate 7 within the recess 14. The second positioning plate 8 is received, in a similar manner, in an annular recess (not shown in the drawings) which is provided in the bottom surface of the second disc portion 42 and is opposed to the annular recess 14. Each of the positioning balls 85 is mostly embedded into the bottom surface of the second disc portion 42, with only a small portion of each ball 85 protruding beyond the bottom surface of the second disc portion 42. When assembled, the portions of balls 85 protruding beyond the bottom surface of the second disc portion 42 may further protrude through one diametrically opposite pair of positioning holes 82 so as to engage one pair of positioning holes 72 of the first positioning plate 7.

The material of the second disc portion 42 is selected to have a flexibility so that the portions of balls 85 protruding beyond the bottom surface of the second disc portion 42 and protruding further through one pair of positioning holes 82 of the second positioning plate 8 may resiliently snap into one pair of positioning holes 72 of the first positioning plate 7, whereby allowing the front and rear segments to be fixed in either one of the two states shown in FIGS. 2 and 3. When it is desired to change the configuration of the DIY electric hand tool of the present invention from the substantially linear configuration shown in FIG. 2 to the "L" shaped configuration or vice versa, a force is applied to overcome the flexibility of the material of the second disc portion 42. When the force required for the pivotal movement between the two segments is applied, each of the positioning balls 85 is forced to withdraw backward from the interface of the two positioning plates, whereby allowing a relative pivotal movement between the first and second positioning plates 7 and 8 and, thus, between the front and rear segments. Thanks to the engaging connection between tabs 73 and slits 15, the first positioning plate 7 pivots together with the first disc portion 12 and, thus, with the front segment of the DIY electric hand tool of the present invention. Similarly, due to the engaging connection between tabs 83 and slits in the second disc portion 42, the second positioning plate 8 pivots together with the second disc portion 8 and, thus, with the rear segment. When the relative pivotal movement between the first and second positioning plates brings the other pair of positioning holes 72 to align with the two positioning balls 85, the flexibility of the material of the second disc portion 42 will again urge each of the positioning balls 85 to snap into the other pair of positioning holes 72, so as to position and latch one segment in a second predetermined angular position relative to the other segment.

To prevent the front and rear segments from separating apart from each other after assembly, a set screw 9 together with an associated washer are threaded into the tapped hole 43A of the third cylindrical portion 43 through the through hole 23A of the second cylindrical portion 23 at the rear end of the front segment.

A substantially linear configuration of the DIY electric hand tool of the present invention, in which the front segment of the DIY tool is positioned in a straight line with the rear segment, is illustrated in FIG. 2. The snapping engagement of the positioning balls 85 into one pair of positioning holes 72 in the first positioning plate 7 together with the stopping function of the stop surface 22A(16A) against the stop surface 42A(32A) will retain the linear configuration of the DIY tool. FIG. 3 shows an "l" shaped configuration of the DIY electric hand tool of the present invention in which the front segment intersects the rear segment of an angle slightly larger than 90 degrees. The snapping engagement of the positioning balls 85 into the other pair of positioning holes 72 in the first positioning plate 7 and the stopping function of the stop surface 22B(16B) against the stop surface 42B(32B) will retain the "L" shaped configuration of the DIY tool.

While the invention has been described in terms of what is presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An electric hand tool, comprising:
 a front segment, having a first empty inner space adapted for the provision of a driving motor and a speed-reducing mechanism driven by said driving motor, a first front end adapted for the mounting of a tool head driven by said driving motor through said speed-reducing mechanism, and a first rear end provided with a first pivoting portion;
 a rear segment, having a second empty inner space adapted for the containment of a battery supplying power to said driving motor, and a second front end provided with a second pivoting portion, said front segment and said rear segment being pivotably connected to each other by a detachable and pivotable connection between said first pivoting portion and said second pivoting portion such that one of said front and rear segments may be pivoted relative to the other between a first position in which said front segment and said rear segment are substantially in a straight line and a second position in which said front segment intersects said rear segment at a predetermined angle, said first pivoting portion including a first disc portion at said first rear end of said front segment, said first disc portion having a first through hole in a central region thereof, and a first annular recess provided about said first through hole in an upper surface of said disc portion; said second pivoting portion including a second disc portion at said second front end of said rear segment, said second disc portion having a cylindrical pole extending downwardly from a lower surface thereof in a central region thereof, said cylindrical pole being aligned with said first through hole and having an outer dimension such that said cylindrical pole may be pivotably inserted through said first through hole to allow a relative pivotal movement between said first disc portion and said second disc portion, said lower surface of said second disc portion having a second annular recess provided about said cylindrical pole, said second annular recess being opposed to said first annular recess; when assembled, said first disc portion and said second disc portion being arranged to overlap each other, with said cylindrical pole being pivotably inserted through said first through hole; and
 a latching mechanism for retaining said one of said front and rear segments in one of said first and second positions relative to the other of said front and rear segments.

2. An electric hand tool as claimed in claim 1, wherein:
 said latching mechanism includes means for retaining said cylindrical pole in said first through hole; a first positioning plate adapted to be mounted and secured in said first annular recess, said first positioning plate having at last one first positioning hole set; a second positioning plate adapted to be mounted and secured in said second annular recess, said second positioning plate having at least one second positioning hole set, said first positioning plate and said second positioning plate forming a frictionally pivotable engagement between their opposing surfaces when said first and second disc portions are arranged to overlap each other; and at least one positioning ball adapted to be partially inserted into one of the opposing surfaces of said first and second disc portions with a portion of said positioning ball protruding out of the surface into which said positioning ball is partially inserted, said protruding portion of said positioning ball further passing through one of said first and second positioning hole sets to resiliently snap into the other of said first and second positioning hole sets, said the other of said first and second positioning hole sets including two separate first and second positioning apertures corresponding to said first position and said second position, respectively, each of said first and second positioning apertures being able to selectively engaged by said protruding portion of said positioning ball;
 whereby, with said protruding portion of said positioning ball snapping into one of said first and second positioning apertures, said front segment may be positioned in a corresponding one of said first and second positions.

3. An electric hand tool as claimed in claim 1, wherein said front segment includes an upper front cover in an upper half-cylinder form and a lower front cover in a lower half-cylinder form, said upper and lower front covers being adapted to be assembled to form said first empty inner space.

4. An electric hand tool as claimed in claim 1, wherein said rear segment includes an upper rear cover in an upper half-cylinder form and a lower rear cover in a lower half-cylinder form, said upper and lower rear covers being adapted to be assembled to form said second empty inner space.

5. An electric hand tool as claimed in claim 1, wherein said front segment includes an upper front cover in an upper half-cylinder form and a lower front cover in a lower half-cylinder form, said upper and lower front covers being adapted to be assembled to each other; and wherein said rear segment includes an upper rear cover in an upper half-cylinder form and a lower rear cover in a lower half-cylinder form, said upper and lower rear covers being adapted to be joined to each other.

6. An electric hand tool as claimed in claim 2, wherein said front segment includes an upper front cover in an upper half-cylinder form and a lower front cover in a lower half-cylinder form, said upper and lower front covers being adapted to be assembled to form said first empty inner space.

7. An electric hand tool as claimed in claim 2, wherein said rear segment includes an upper rear cover in an upper half-cylinder form and a lower rear cover in a lower half-cylinder form, said upper and lower rear covers being adapted to be assembled to form said second empty inner space.

8. An electric hand tool as claimed in claim 2, wherein said front segment includes an upper front cover in an upper half-cylinder form and a lower front cover in a lower half-clinder form, said upper and lower front covers being adapted to be assembled to each other; and wherein said rear segment includes an upper rear cover in an upper half-cylinder form and a lower rear cover in a lower half-cylinder form, said upper and lower rear covers being adapted to be assembled to each other.

* * * * *